United States Patent
Sinnema et al.

(10) Patent No.: US 8,950,316 B2
(45) Date of Patent: Feb. 10, 2015

(54) APPARATUS FOR PREPARING BABY MILK FROM INSTANT FORMULA

(75) Inventors: Anke Sinnema, Drachten (NL); Gertrude Riette Van Der Kamp, Groningen (NL); Klaas Kooijker, Drachten (NL)

(73) Assignee: Koninklijke Philips N.V., Eindhoven (NL)

( * ) Notice: Subject to any disclaimer, the term of this patent is extended or adjusted under 35 U.S.C. 154(b) by 1176 days.

(21) Appl. No.: 12/300,806

(22) PCT Filed: May 9, 2007

(86) PCT No.: PCT/IB2007/051744
§ 371 (c)(1),
(2), (4) Date: Nov. 14, 2008

(87) PCT Pub. No.: WO2007/135597
PCT Pub. Date: Nov. 29, 2007

(65) Prior Publication Data
US 2009/0188394 A1    Jul. 30, 2009

(30) Foreign Application Priority Data
May 19, 2006 (EP) .................................. 06114225

(51) Int. Cl.
*A47J 31/44* (2006.01)
*A47J 31/00* (2006.01)
*A47J 31/40* (2006.01)

(52) U.S. Cl.
CPC .................................. *A47J 31/404* (2013.01)
USPC ....... 99/289 R; 99/323.3; 99/275; 222/146.5; 222/238

(58) Field of Classification Search
USPC ................... 99/348, 279, 275, 323.3, 289 R; 222/236, 238, 220, 227, 146.5; 366/195, 311, 194, 601, 186, 343, 366/155.1, 248
See application file for complete search history.

(56) References Cited

U.S. PATENT DOCUMENTS

| | | | | |
|---|---|---|---|---|
| 950,086 | A * | 2/1910 | Wilson | 222/618 |
| 2,795,358 | A * | 6/1957 | Saxlund | 222/227 |
| 3,570,569 | A * | 3/1971 | Hartley et al. | 241/82.6 |
| 4,083,475 | A * | 4/1978 | Venner et al. | 222/198 |
| 4,116,246 | A | 9/1978 | Franzen | |
| 4,291,647 | A * | 9/1981 | Legrain | 119/51.11 |
| 4,342,346 | A | 8/1982 | Wei | |
| 4,487,339 | A * | 12/1984 | Ellwood | 222/236 |
| 4,491,420 | A * | 1/1985 | Addison | 366/158.2 |
| 4,493,442 | A * | 1/1985 | Hanson, Jr. | 222/241 |
| 4,718,579 | A | 1/1988 | Brody et al. | |
| 5,125,535 | A * | 6/1992 | Ohlman | 222/77 |

(Continued)

FOREIGN PATENT DOCUMENTS

DE    1870789 U    4/1963
DE    6753834       1/1970

(Continued)

*Primary Examiner* — Reginald L Alexander

(57) ABSTRACT

An apparatus for preparing baby milk from water and dry formula includes a formula supply system having a reservoir for holding formula and a feeder for feeding formula out off the reservoir through an outlet opening in the reservoir. The apparatus further includes a scraper for guiding formula towards and through the outlet opening into the feeder. The scraper is arranged to move closely along an inner wall portion of the reservoir that borders on the outlet opening.

12 Claims, 6 Drawing Sheets

(56) References Cited

U.S. PATENT DOCUMENTS

| | | | |
|---|---|---|---|
| 5,277,337 A | | 1/1994 | Ford et al. |
| 5,339,997 A | * | 8/1994 | Billivant et al. ............ 222/238 |
| 5,363,747 A | * | 11/1994 | Clark et al. .................. 99/348 |
| 5,615,951 A | * | 4/1997 | Gabriele ...................... 366/311 |
| 5,709,322 A | * | 1/1998 | Ricciardi ..................... 222/227 |
| 6,173,117 B1 | | 1/2001 | Clubb |
| 2004/0136261 A1 | * | 7/2004 | Huber et al. ............... 366/152.1 |
| 2004/0173637 A1 | * | 9/2004 | Whippie et al. ............ 222/236 |
| 2005/0121469 A1 | * | 6/2005 | Landers et al. ............ 222/185.1 |
| 2005/0230343 A1 | | 10/2005 | Huber |
| 2007/0034084 A1 | * | 2/2007 | Shertok et al. ................ 99/279 |

FOREIGN PATENT DOCUMENTS

| | | |
|---|---|---|
| DE | 2316403 A1 | 10/1974 |
| DE | 29611088 U1 | 1/1997 |
| EP | 0654430 A2 | 5/1995 |
| EP | 1393662 A1 | 3/2004 |
| GB | 1223754 | 3/1971 |
| JP | 5336773 | 9/1951 |
| JP | 58026735 A | 2/1983 |
| JP | 59134877 | 9/1984 |
| JP | 172386 U | 12/1989 |
| JP | 9173213 A | 7/1997 |

* cited by examiner

APPARATUS FOR PREPARING BABY MILK FROM INSTANT FORMULA

The invention relates to an apparatus for preparing baby milk from water and dry formula, the apparatus comprising a formula supply system, which comprises a reservoir for holding formula and feeding means for feeding formula out off the reservoir through an outlet opening in said reservoir.

Such apparatus is known from DE 296,11,088. This known apparatus comprises a funnel shaped reservoir and feeding means in the form of a vertical auger that partly extends in said reservoir. By rotating the auger any desired amount of formula can be discharged from the reservoir and supplied to some mixing unit, where the formula can be mixed with water to produce baby milk. A general problem with formula is that it can become sticky, especially when exposed to humidity. In the known apparatus, this formula will then stick to the inner wall of the reservoir and form bridges and cavities formed there between. Due to this phenomenon, the auger will receive an inconsistent supply of formula. This affects the dosing accuracy of the auger and may ultimately result in baby milk being prepared with an improper concentration of formula.

From US 2005/0230343 a baby milk apparatus is known, wherein the formula supply system comprises a reservoir, a horizontal auger, positioned in the reservoir near the bottom thereof, and a mixing wheel positioned above the auger. This mixing wheel loosens part of the formula situated above the auger. However, it does not prevent formula from sticking to the reservoir wall and form bridges. Hence, this known supply system suffers from the same disadvantages as the aforementioned supply system.

It is therefore an object of the invention to provide an apparatus of the abovementioned type, wherein the disadvantages of the known apparatuses are minimized. More particularly, it is an object of the invention to provide an apparatus for preparing baby milk form water and dry formula, wherein the formula supply system can supply a consistent and accurate amount of formula.

In order to achieve this object, the apparatus according to the invention is characterized in that scraping means are provided for guiding formula towards the outlet opening and the feeding means, wherein said scraping means are arranged to move closely along an inner wall portion of the reservoir that borders on said outlet opening. In this description the term 'closely' is to be interpreted as 'in direct contact with or at a short distance of' the wall portion, for instance within approximately 1 mm from said wall portion.

Thanks to such scraping means, formula can be prevented from sticking to the wall of the reservoir, at least around the outlet opening. As a result, higher situated formula will get no chance to stick to the reservoir wall, since said formula will descend along the scraped wall portion, thereby taking in the place of the scraped away formula. This formula will then in turn be scraped away, etc. Since sticking is prevented, the formation of bridges and cavities will be prevented as well. Hence, formula can be fed from the reservoir into the feeding means in a consistent, substantially homogenous flow, allowing accurate control of the discharged formula amounts.

According to an aspect of the invention, the scraping means comprise at least two arms that are rotatable around an axis that extends substantially parallel to a centre line of the outlet opening. Thanks to such configuration, a filling opening of the feeding means, which connects to the outlet opening of the reservoir, will be continuously leveled off by the rotating arms passing said filling opening. As such, any irregularities, which may still exist in the flow of formula, such as air bubbles or small cavities, will be eliminated, resulting in a consistent, accurately controlled supply of formula.

In further elaboration, the outlet opening may be positioned eccentric in the circular wall portion that is covered by the rotating arms of the scraping means. Thanks to such location, the outlet opening may extend across said circular wall portion, without being interrupted by a rotating shaft of the scraping means. Tests of applicant have shown that with such elongated outlet opening, even better filling of the feeding means can be achieved. This seems to be caused by the fact that formula that has been fed to the feeding means via an upstream end of the outlet opening is transported along said opening while new formula is continuously added through said opening, by the rotating arms. Hence, by the time said upstream formula reaches a downstream end of the opening, the feeding means at said downstream location will be completely filled.

According to another aspect of the invention, the arms are curved in rotation direction so as to have a free end of the arm trail in rotation direction. Such design contributes to optimize the filling process of the feeding means, as the curved arms will wipe formula from the centre of the reservoir wall portion towards the edges thereof, thereby causing the formula to be spread evenly across said wall portion and the outlet opening provided therein. This may help to fill the entire outlet opening or filling opening of the feeding means, even when only a little bit of formula is left in the reservoir. The curved shape may furthermore ensure that during rotation, part of the arm will always rest on and therefore will be supported by the wall portion adjacent the outlet opening, while the other part may extend over said opening. This may help to prevent that the arm, under the bending load of formula resting thereon, may bend downwards into the opening and cause the rotating movement to be blocked and the outlet opening to be jammed.

In a preferred embodiment each arm may feature a similar curvature. This too may help to distribute the formula more evenly along the reservoir wall portion, or at least the filling opening of the feeding means.

According to a further advantageous aspect of the invention, the curved arms may be slightly biased in their curved direction. Thanks to such biasing, close contact between the arms and the reservoir wall can be assured and variations in the dimensions of the reservoir and/or the arms can be absorbed. Hence manufacturing tolerances can be less critical. According to yet another advantageous aspect of the invention, the scraping means are rotatable around an axis extending substantially at right angles to a centre line of the outlet opening. Advantageously, the arms of such scraping means have a three-dimensional shape, for instance as shown in FIG. 2, so as to cover a three-dimensional space during use, for instance a sphere or spheroid. Thanks to such design, the scraping means can act as stirring means, for loosening and rummaging the formula, thereby preventing even better the formation of bridges and cavities.

According to a further aspect of the invention, the feeding means are arranged to have their transport direction slant upward from the outlet opening of the reservoir, so that a discharge opening of the feeding means is situated above the filling opening. Thanks to such slanted orientation, the height of the apparatus may be reduced, because a mixing unit, receptacle or baby bottle can be fitted underneath said raised discharge opening of the feeding means, while the formula reservoir can extend at least partly adjacent instead above said feeding means and the receptacle or baby bottle. The reduced height may for instance be convenient when storing the apparatus after use.

Furthermore, thanks to its raised, upwardly pointed position, the discharge opening of the feeding means is better kept out of the stream of vapors that may rise from the receptacle or baby bottle. Consequently, formula leaving the discharge opening is prevented from sticking to and clogging said opening. Obviously this is advantageous from a hygienic point of view. Bacteria growth may be prevented or reduced. Also, the chance of spilling formula upon ending the discharge session is decreased.

The transport direction of the feeding means can for instance include an angle with the horizontal plane that lies between 10 and 70 degrees, preferably between 30 and 50 degrees.

The formula supply system may further comprise indication means for indicating the formula level in the reservoir. An alarm may be triggered when the formula level drops below a predetermined minimum level, so as to inform the user that a refill is required. Thus, it can be avoiding that baby milk is prepared with too little formula.

According to a further elaboration of the invention, the reservoir has a substantially convex bottom. When the reservoir is getting empty, an elevated centre part of said bottom will become visible, and may for instance be detected by an optical sensor. The aforementioned indication means can than be controlled by a signal from the detection means.

In further elaboration, the reservoir may be at least partly transparent. This can provide a user with visual information regarding the amount of formula in the reservoir and the condition thereof.

Further advantageous embodiments of the invention are described in the dependent claims. The invention will be further elucidated by means of exemplary embodiments with reference to the accompanying drawings in which:

FIG. 1 schematically shows a general set-up of an apparatus according to the invention, suitable for preparing baby milk from instant formula;

FIG. 3b shows a top view of the second embodiment of the invention as shown in FIG. 3a;

Figure 1:
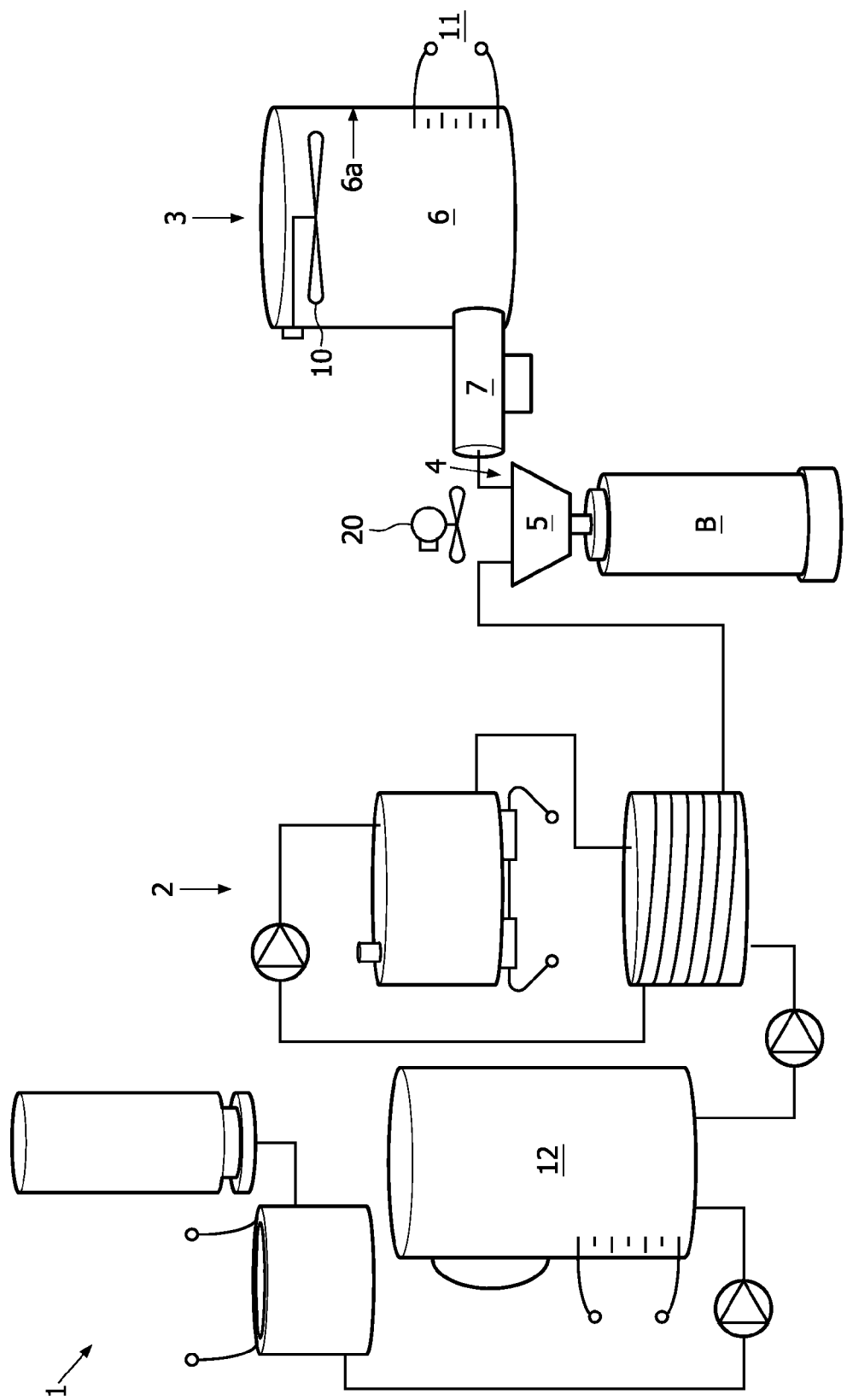

The apparatus 1 for preparing baby milk from an instant baby milk formula and water, as shown in FIG. 1, comprises a water supply system 2, a formula supply system 3 and a mixing unit 4. In the presented embodiment, the mixing unit 4 comprises a mixing chamber 5, provided with suitable mixing provisions (not visible) for having water from the water supply system 2 and formula from the formula supply system 3, mixed into a smooth, homogenous baby milk with a desired concentration, free of lumps. Subsequently, this mixture may be released into the bottle B, placed underneath the mixing unit 4. Alternatively, mixing can be done in said bottle B, outside the apparatus 1.

The water supply system 2 is arranged for supplying water of a predetermined temperature to the mixing unit 4. This water preferably has been sterilized by heating. To that end the water supply system 2 may be arranged to boil the water or to heat the water at a temperature between approximately 70 degrees and 100 degrees Celsius during a predetermined amount of time. After sterilizing the water, it may be cooled down to reach a desired consumption temperature, for instance between room temperature and 45 degrees Celsius, preferably around 37 degrees Celsius. Cooling down may for instance be done, using a heat exchanger.

The formula supply system 3 comprises a reservoir 6 that holds an amount of instant formula, for instance sufficient for a one days supply. The reservoir 6 may be at least partly transparent, so that a user can inspect the content and the supply levels. The formula supply system 3 further comprises suitable feeding means 7 for feeding the formula from the reservoir 6 towards the mixing unit 4. A fan 20 may be situated above the mixing unit 4, adjacent a discharge opening 13 of the feeding means 7. During use, said fan 20 can blow away any vapors, which may rise from the mixing unit 4 or bottle B. As such, said vapors are prevented from reaching the discharge opening 13, which may help to prevent formula from sticking to and clogging said opening 13.

The feeding means 7 may for instance comprise an auger 8 (see FIGS. 2-5), arranged underneath an outlet opening 9 in the reservoir 6. The amount of formula led into the mixing unit 4 can for instance be controlled by having the auger 8 rotate at a predetermined amount of time or by counting its revolutions. Thus, the auger 8 can serve as a transport and dosing device. Of course, other configurations are possible. For instance, transport can be done by a scraper, a piston, suction or other pressure differences, whereas dosing may be done with suitable valves or a calibrated volume.

The formula supply system 3 further comprises scraping means 10 (see also FIGS. 2-5) that are movable along a wall portion of the reservoir 6 that contains the outlet opening 9.

Additionally, the formula supply system 3 may be provided with indication means 11 that are adapted to indicate the amount of formula, i.e. the formula level in the reservoir 6. When it reaches a predetermined level, the user may be warned that the reservoir 6 needs (re)filling. The indication means 11 may generate a signal, such as an audio signal or a visual signal, for example a warning light, to alarm the user. Indication means 11 may also be a visual volume indication provided on a transparent part of the reservoir 6, allowing the user to verify the formula level.

The apparatus 1 may further comprise a storage medium (not shown), for storing information regarding for instance different feeding programs, prescribed water/formula concentrations depending on the formula brand, age and/or weight of the toddler, safety threshold values for triggering an alarm when exceeded, etc. Preferably, the storage medium is programmable, so as to allow a user to store its personal preferences.

A controller (not shown) may be provided for controlling selected process parameters towards a desired set point, for example the amount of formula that forms one dosage. Controlling can be done by adjusting for instance the rotational speed of the auger, the rotational speed of the scraping means, etc.

The apparatus 1 can be used as follows. Before starting operation, a reservoir 12 of the water supply system 2 is filled with water and the reservoir 6 of the formula supply system 3 is filled with formula. Next, the user may select a specific preparation program, the amount of baby milk to be prepared, a desired water/formula concentration, etc. The water is sterilized by heating it to sterilization temperature and cooled down to consumption temperature. The desired quantity of water can be dosed into the mixing unit 4. Meanwhile, an appropriate amount of formula has been discharged by the discharge opening 13 of the feeding means 7 arranged above a baby bottle B. The formula has been discharged from the reservoir 6 with aid of the scraping means 10. Then the auger 8 is rotated and transports the instant formula from the filling opening 9 towards the discharge opening 13 of the feeding means 7 and releases it into the mixing unit 4. Next, the water and formula are mixed in the mixing unit 4 and the resulting mixture, i.e. the ready-made baby milk, is poured into a bottle B or other receptacle, ready for consumption.

In a preferred operation mode, activation and deactivation of the water supply system 2 and the formula supply system 3 is adjusted to each other in such way that each mixing session starts and ends with a small amount of water. At the start of the session this water forms a film at the inside of the mixing unit 4, thereby preventing formula from sticking thereto. At the end of the mixing session, the water washes away any remains of the mixture. Thus, contamination of the mixing unit 4 is avoided or at least reduced.

Figure 2:
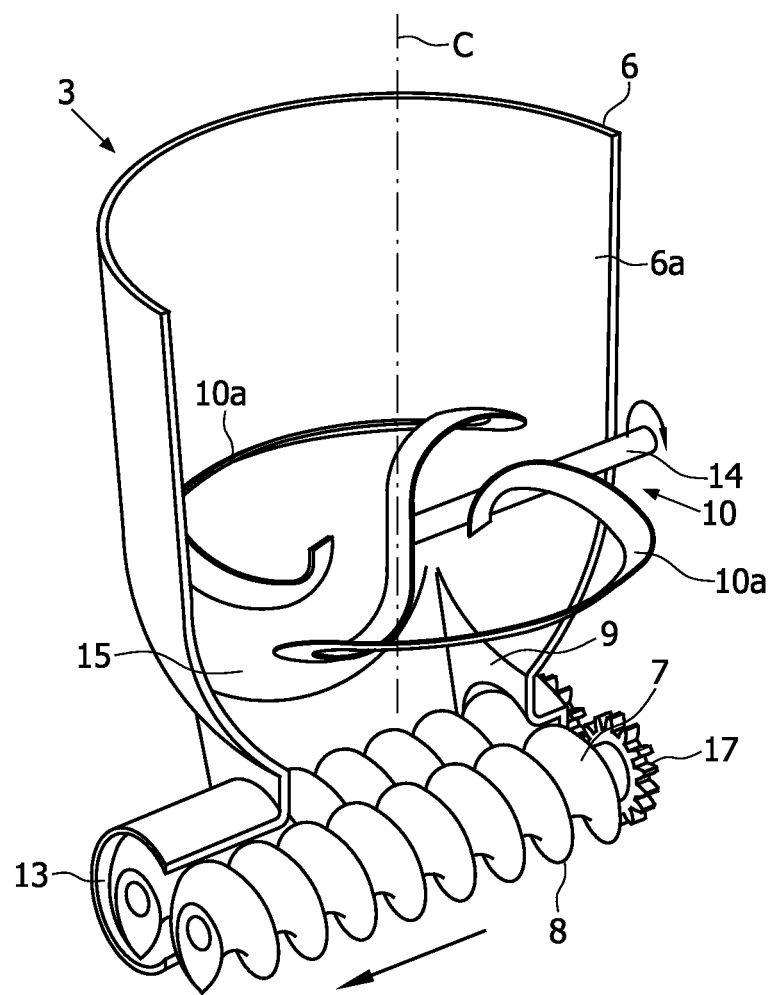
FIG. 2 shows a perspective cross sectional view of a first embodiment of a formula supply system according to the invention.

In FIG. 2 a first embodiment of a formula supply system 3 according to the invention is shown. The scraping means 10 comprise curved arms 10a that are rotatable around an axis 14. Said axis 14, in the illustrated embodiment, is arranged substantially perpendicular to a central axis C of the reservoir 6. The arms 10a extend from the axis 14 towards the inner reservoir wall 6a and end at a short distance there from. As shown in FIG. 2, the arms 10a have free ends that curve away from the inner reservoir walls 6a towards a center of the reservoir and terminate with extremities that do not contact each other so that the arms 10a do not form a closed loop but rather form an open loop. In one rotatable position of the scraper 10 shown in FIG. 2, the open extremities extend in opposite directions that are parallel to the longitudinal axis V of the reservoir 6. For example, in the position of the scraper 10 shown in FIG. 2, an open extremity of the right arm extends downward parallel to the longitudinal axis C, while an open extremity of left arm extends upward parallel to the longitudinal axis C. In this embodiment, the reservoir 6 has a substantially concave bottom portion 15. During rotation of the scraping means 10, the outer edge of the arms 10a will describe a substantially spherical path, which closely conforms to the inner surface of said bottom portion 15, and hence allows said arms 10a to scrape off any formula that clings to said inner surface and guide said formula to the outlet opening 9 and the feeding means 7. Furthermore, the arms 10a are configured such, that during rotation, substantially the entire space enclosed by said spherical path will be traversed once or more by said arms 10a. Therefore, any formula situated within said space will be thoroughly rummaged and any bridges and/or cavities that may have formed in said formula will be eliminated. Thus, a steady, continuous feed of formula will be supplied to the feeding means 7. Even when the reservoir 6 is almost empty, the scraping action of the arm edges 10a can provide the auger 8 with a substantially continuous feed.

In the illustrated embodiment the feeding means 7 comprise a double auger 8. Alternatively, a single auger could be used. The auger 8 is driven by a driving mechanism 17, which enables transporting of the formula in the direction of the discharge opening 13. It is possible to have the driving mechanism 17 drive the scraping means 10 as well, wherein possible differences in rotational speeds of the auger 8 and the scraping means 10 may be achieved by the use of suitable transmission means (not shown). Furthermore, the controller (not shown) can control the feeding means 7 and the scraping means 10 to cooperate to provide a constant formula flow towards the mixing unit 4.

Figure 3A:
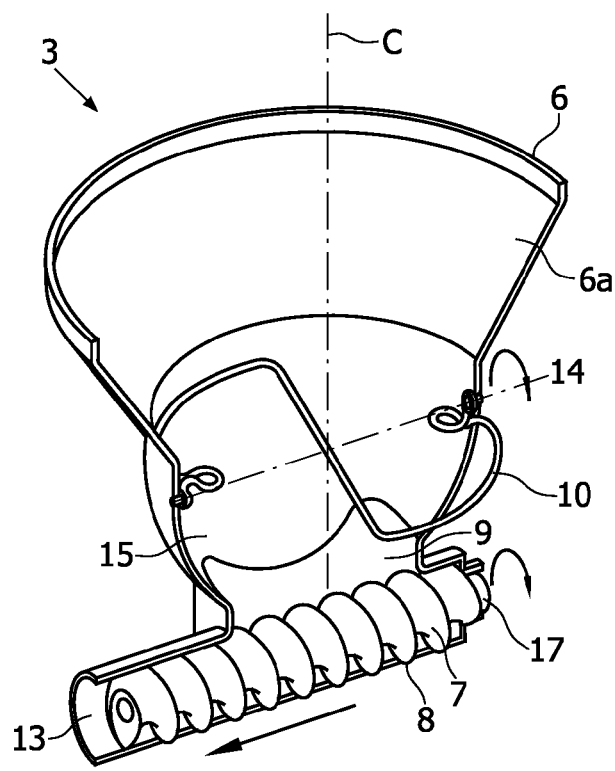
FIG. 3a shows a perspective cross sectional view of a second embodiment of the formula supply system.
Figure 3B:
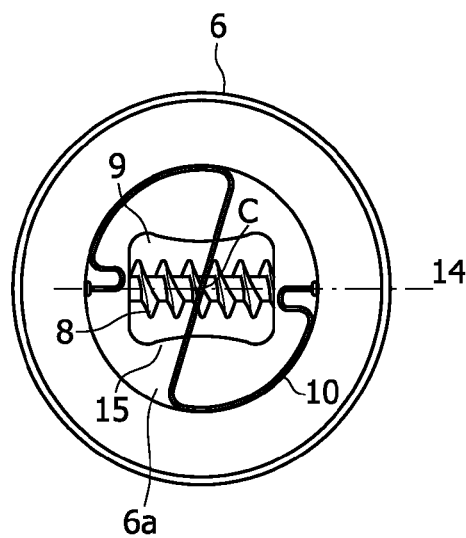

In FIGS. 3a and 3b an alternative embodiment of the formula supply system 3 is shown, in cross section and plan view respectively. Components similar to those in FIG. 2 have been assigned with similar reference numerals. The embodiment differs from the one shown in FIG. 2 in that the scraping means 10 are of slightly modified, in particular simplified design. However, the effects to be attained with these scraping means 10 are comparable to those described in relation to FIG. 2. It will be clear that during rotation of the scraping means 10, the formula in the convex bottom part 15 of the reservoir 6 is mixed, loosened and cleared from any bridges and/or cavities. The formula is guided into the filling opening 9 and leveled off by the passing arm 10a, causing the filling opening 9 to be properly filled.

Figure 4A:
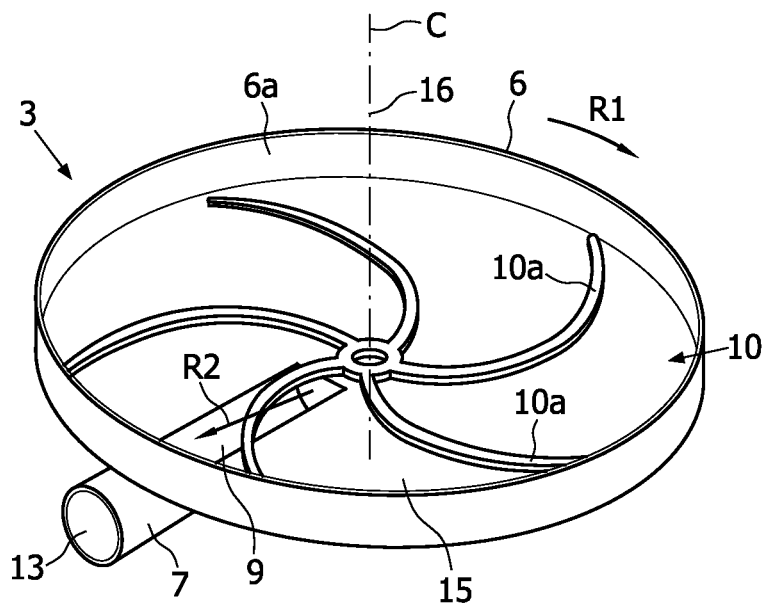
FIGS. 4a and 4b show a perspective view first and a second alternative embodiment of the invention, respectively.
Figure 4B:
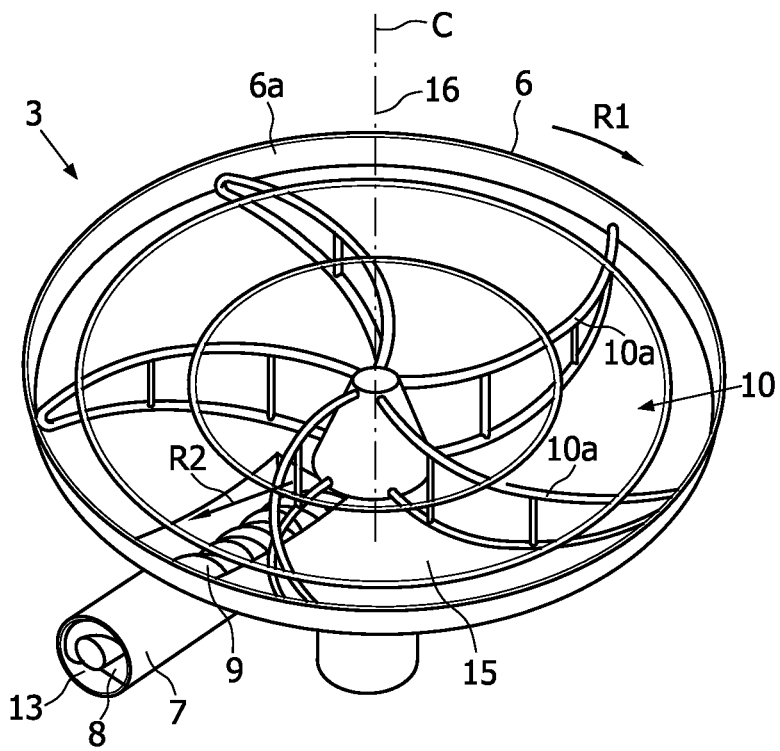

FIGS. 4a and 4b show two alternative embodiments of a formula supply system 3 according to the invention, in particular the scraping means 10 thereof. In these embodiments, the formula reservoir 6 has a substantially circular, flat bottom 15, surrounded by a substantially cylindrical wall 6a. The scraping means 10 comprise a plurality of arms 10a that are rotatable around an axis 16, which substantially coincides with a centre line C of the reservoir 6, and which arms 10a extend from said axis 16 towards the cylindrical reservoir wall 6a. The arms 10a are shown to be curved in rotation direction (indicated by arrow R1), which helps to optimize proper filling of the opening 9 to the feeding means 7. If the scraping means 10 are rotated in the direction of arrow R1, the shape of the arms causes the formula to be transported in the direction of arrow R2 thereby causing the opening 9 to be filled over its entire surface. According to an alternative embodiment (not shown), the opening 9 may be positioned slightly eccentric from the centre line C. In such case the opening 9 may be elongated so as to cross the entire bottom of the reservoir 6. Such elongated shape may result in even better filling of the underlying feeding means 7, since while formula is transported from an upstream end of the opening 9 to a downstream end thereof, new formula is continuously replenished through said opening 9 by the rotating arms 10a, so as to fill any cavities that may exist in the formula in the feeding means extending below said opening 9.

The arms 10a or the scraping means 10 can be of a metal and may be pre-stressed to be able to deal with forces that occur during rotation. Instead, the scraping means 10 may be of a plastic or another suitable material. In the latter case, the arms are preferably construed as shown in FIG. 4b, wherein the design is optimized to resist any vertical forces which may be exerted on the arms 10a by the weight of the formula resting on top of said arms 10a. Of course, the other scraping means, shown in FIGS. 2, 3 and 5 can be made of metal or plastic as well.

In a preferred embodiment, the bottom 15 of the reservoir 6 may be convex, so as to have an elevated centre portion (not shown). Such shape can advantageously used in combination with optical detection means for detecting the formula level in the reservoir 6. When the formula level drops, the centre part will become visible, which may be detected by suitable optical means.

Figure 5A:
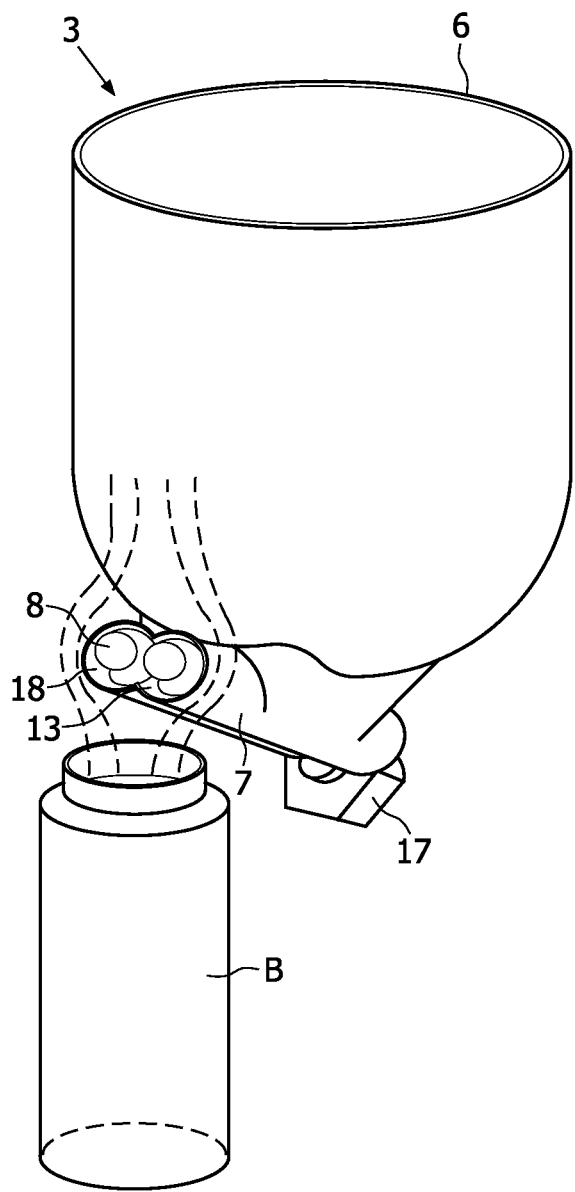
FIGS. 5a and 5b show a perspective view and a cross sectional view, respectively, of a further alternative embodiment of the invention.
Figure 5B:
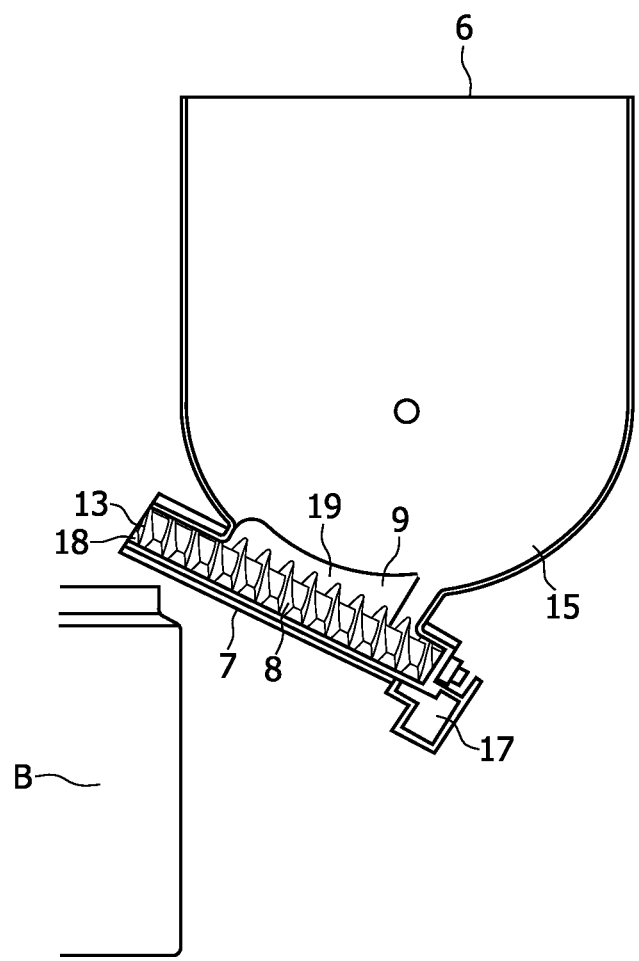

FIGS. 5a and 5b show a further embodiment of the invention, in perspective view and cross section respectively. In this embodiment, the feeding means 7 are arranged to include an angle with respect to a horizontal plane, thereby providing the feeding means 7 with a lower end 17 and an upper end 18, the lower end 17 containing the filling opening 9, the upper end containing the discharge opening 13.

When a mixing chamber and/or bottle B, filled with ready made baby milk, is positioned underneath said discharge opening 13, vapors W rising from the milk are not likely to enter the discharge opening 13, thanks to the angled configuration of the feeding means 7. The formula contained in the feeding means 7 is therefore prevented from becoming lumpy and sticky. By using an askew feeding means 7 according to FIGS. 5a,b, a fan 20 as described in FIG. 1 may be omitted. The askew configuration may furthermore prevent spilling of formula, and allows the apparatus to have a relatively small height.

Although illustrative embodiments of the present invention have been described in greater detail with reference to the accompanying drawings, it is to be understood that the invention is not limited to these embodiments. All combinations (of parts) of the embodiments shown and described are explicitly understood to be incorporated within this description and to fall within the scope of the invention. Various changes or modifications may be effected by one skilled in the art without departing from the scope or the spirit of the invention as defined in the claims. For example, the askew feeding means as described above, can be used in formula supply systems comprising different kinds of scraping means. Even formula supply systems that are not provided with scraping means can be equipped this the askew feeding means.

The invention claimed is:

1. An apparatus for preparing baby milk from water and dry formula, the apparatus comprising:
   a water supply system for supplying water;
   a formula supply system for supplying the dry formula, wherein the formula supply system comprises a reservoir for holding the dry formula, a feeder for feeding the dry formula out of the reservoir through an outlet opening in the reservoir, and a scraper configured to guide the dry formula towards the outlet opening in the reservoir; and
   a mixing unit for bringing the water and the dry formula together,
   wherein the scraper is further configured to move closely along an inner wall portion of the reservoir that borders on the outlet opening,
   wherein the outlet opening is elongated and extends across the inner wall portion substantially from a center of the inner wall portion to an edge of the inner wall portion,
   wherein the scraper comprises at least two arms that are rotatable around a rotation axis extending substantially perpendicular to a longitudinal axis of the reservoir,
   wherein the at least two arms are curved and have free ends that curve away from the walls towards a center of the reservoir, and
   wherein the free ends terminate with extremities that do not contact each other and, in one rotable position of the scraper, extend along a direction parallel to the longitudinal axis of the reservoir.

2. The apparatus according to claim 1, wherein the outlet opening is located eccentric with respect to the rotation axis of the scraper.

3. The apparatus according to claim 1, wherein the curved arms are biased in the rotation direction.

4. The apparatus according to claim 1, wherein the inner wall portion, along which the scraper move closely during use, is curved in two directions to trace a spherical volume.

5. The apparatus according to claim 1, wherein the scraper is further configured to rummage a three dimensional space during rotation including a sphere or spheroid.

6. The apparatus according to claim 1, wherein the scraper has a three-dimensional shape.

7. The apparatus according to claim 1, wherein the feeder is configured to have a transport direction that slants upward from the outlet opening of the reservoir for feeding the dry formula out of the reservoir in the transport direction.

8. The apparatus according to claim 7, wherein an angle between the transport direction of the feeder and the horizontal plane lies at least one of between 10 and 70 degrees, and between 30 and 50 degrees.

9. The apparatus according to claim 1, wherein the formula supply system comprises indicator configured to indicate that an amount of formula in the reservoir has reached a predetermined level.

10. The apparatus according to claim 1, wherein the outlet opening is provided in or near a bottom of the reservoir and an inner surface of said bottom has a convex shape.

11. The apparatus of claim 1, wherein a first extremity of the extremities extends in a first direction and a second extremity of the extremities extends in a second direction which is opposite to the first direction.

12. An apparatus for preparing baby milk from water and dry formula, the apparatus comprising:
    a water supply system for supplying water;
    a formula supply system for supplying the dry formula, wherein the formula supply system comprises a reservoir for holding the dry formula, a feeder for feeding the dry formula out of the reservoir through an outlet opening in the reservoir, and a scraper configured to guide the dry formula towards the outlet opening in the reservoir; and
    a mixing unit for bringing the water and the dry formula together,
    wherein the scraper is further configured to move closely along an inner wall portion of the reservoir that borders on the outlet opening,
    wherein the outlet opening is elongated and extends across the inner wall portion substantially from a center of the inner wall portion to an edge of the inner wall portion,
    wherein the scraper comprises at least two arms that are rotatable around a rotation axis extending substantially perpendicular to a longitudinal axis of the reservoir,
    wherein the at least two arms are curved and have free ends that curve away from the walls towards a center of the reservoir,
    wherein a first extremity of a first arm of the at least two arms extends in a first direction and a second extremity of a second arm of the at least two arms extends in a second direction which is opposite to the first direction,
    wherein, in one rotatable position of the scraper, the first direction and the second direction are parallel to the longitudinal axis of the reservoir, and
    wherein the at least two arms form an open loop where the first extremity does not contact the second extremity.

* * * * *